United States Patent [19]

Wilson et al.

[11] Patent Number: 5,031,653

[45] Date of Patent: Jul. 16, 1991

[54] DIFFERENTIAL CYLINDER PRESSURE GAIN COMPENSATION FOR SINGLE STAGE SERVOVALVE

[75] Inventors: Samuel L. Wilson, Newhall; Timothy C. Bryarly, Palmdale; Clyde E. Cobb, Lakeview Terrace, all of Calif.

[73] Assignee: HR Textron Inc., Valencia, Calif.

[21] Appl. No.: 552,737

[22] Filed: Jul. 12, 1990

[51] Int. Cl.[5] .......... G05D 16/20

[52] U.S. Cl. .......... 137/83; 137/625.64; 91/3; 91/370; 91/384

[58] Field of Search .......... 137/83, 625.64, 625.62; 91/3, 384, 370, 372

[56] References Cited

U.S. PATENT DOCUMENTS

| | | | |
|---|---|---|---|
| 3,017,864 | 1/1962 | Atchley | 137/83 X |
| 3,437,101 | 4/1969 | Coakley | 137/83 |
| 3,667,344 | 6/1972 | Wesbury | 91/3 X |
| 4,368,750 | 1/1983 | Burton | 137/83 X |

*Primary Examiner*—Alan Cohan

*Attorney, Agent, or Firm*—Nilsson, Robbins, Dalgarn, Berliner, Carson & Wurst

[57] ABSTRACT

Pressure gain compensation for a single-stage servovalve of the jet pipe type. The pressure gain compensation is provided by a separate reciprocally mounted spool having a feedback wire connected between the spool and the ejector jet. The spool has a differential pressure applied across the ends thereof from the receptors disposed opposed the ejector jet. Movement of the spool applies a force feedback to the ejector jet which is proportional to the pressure differential across the receptors and is opposite the force applied to the ejector by the torque motor to thereby compensate for pressure gain.

4 Claims, 4 Drawing Sheets

DIFFERENTIAL CYLINDER PRESSURE GAIN COMPENSATION FOR SINGLE STAGE SERVOVALVE

FIELD OF THE INVENTION

This invention relates generally to electrohydraulic servovalves and more particularly to a jet pipe electrohydraulic servovalve which includes pressure gain compensation for the first stage thereof.

BACKGROUND OF THE INVENTION

Typically in high flow gain single-stage jet pipe servovalves, both the pressure gain and flow gain rise rather sharply upon the application of appropriate electrical signals to the torque motor causing movement of the ejector jet relative to the receptors in the servovalve. Traditionally, both pressure and flow gain track each other closely. It has been found that in some applications, rapid rises in pressure, that is steep pressure gain, may generate unwanted signals. For example, in redundant control systems such rapid rises in pressure may appear to detection portions of the system as a failure or malfunction in one or more portions of the system. It has thus been determined that in some applications, single stage jet pipe servovalves or the first stage of multi-stage valves, it is desireable to compensate such pressure gain by reducing the level thereof without at the same time degrading the flow gain characteristics of the valve.

The present invention provides differential pressure gain compensation for single stage jet pipe servovalves or in the first stage of multiple stage jet pipe servovalves so as to maintain a relatively low level of pressure gain without degrading the flow gain thereof. Such is accomplished by providing a mechanical feedback source which is proportional to the pressure differential between the receptors of the jet pipe servovalve.

Pressure feedback in electrohydraulic servovalves is well known in the prior art and the best known such prior art is reflected in U.S. Pat. Nos. 3,398,647 and 3,487,750. The devices disclosed in each of these two prior art patents generate a mechanical feedback signal responsive to load pressure at the utilizing apparatus. The mechanical feedback signal is then applied to the servo control system. Although these prior art devices develop mechanical feedback signals responsive to pressure at the load, applicants are unaware of any prior art devices which utilize a mechanical feedback signal proportional to pressure differential at the receptors for purposes of compensating pressure gain.

SUMMARY OF THE INVENTION

A servovalve constructed in accordance with present invention includes an ejector jet disposed opposed first and second receptors which receive fluid from the ejector jet responsive to movement of the ejector jet by a torque motor which has electrical control signals applied thereto. A pair of output ports is connected to the receptors for applying fluid received thereby to a load. Spool means is mounted for reciprocal movement and has the fluid pressure at the receptors connected across opposite ends of the spool so as to move the spool responsive to pressure differential thereacross. There are no other fluid pressure connections to the spool means. A mechanical feedback means is connected between the spool means and the ejector jet for applying a force feedback to the ejector jet which is proportional to the pressure differential across the receptors and is opposite the force applied by the torque motor to thereby compensate for pressure gain.

DETAILED DESCRIPTION

By reference to FIGS. 1 through 6, there is illustrated a pressure gain compensation jet pipe servovalve constructed in accordance with the principles of the present invention. The various figures are schematic representations or partial illustrations of the structures involved emphasizing only the specific features of the present invention. Jet pipe servovalves are well known in the prior art and details of the construction thereof are not shown or described herein. As opposed to such description and illustration, applicants hereby incorporate by reference the disclosures of U.S. Pat. Nos. 3,437,101; 3,584,649 and 4,201,114 as illustrative of jet pipe servovalves to which the features of the present invention may be applied.

Figure 1:
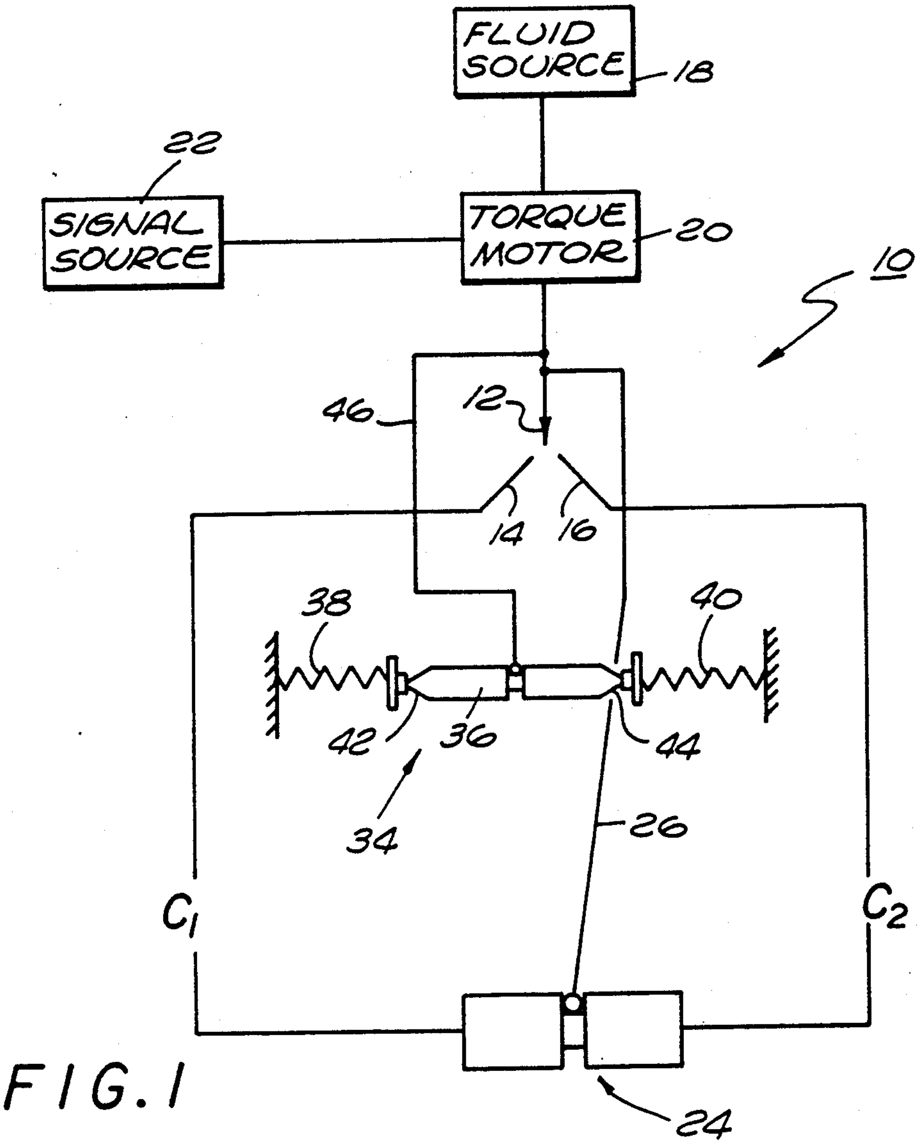
FIG. 1 is a schematic diagram of an electrohydraulic servovalve constructed in accordance with the principals of the present invention.

Referring now more specifically to FIG. 1, there is provided a schematic representation of a pressure compensated jet pipe servovalve of the present invention. As is therein shown, a jet pipe servovalve 10 includes a feed pipe 55 terminated by an ejector jet 12 and a pair of receptors 14 and 16 which are disposed opposed the ejector jet 12. A source of fluid under pressure 18 is connected to the feed pipe 55 so that fluid from the source will flow from the ejector jet 12 and impinge upon the receptors 14 and 16. A torque motor 20 has electrical signals applied thereto from a signal source 22 as is well known in the prior art. Responsive to the application of signals from the source 22, the torque motor applies a force to the ejector jet 12 causing it to rotate relative to the receptors 14 and 16 thereby applying more or less fluid under pressure to the individual receptors 14 and 16 depending upon the position of the ejector jet 12 relative to the receptors 14 and 16 as is well known in the prior art. A pair of ports C1 and C2 are connected to the receptors 14 and 16 respectively so that the fluid under pressure received by the receptors 14 and 16 may be applied to any desired load such as is schematically illustrated at 24.

As is well known in the art, if the load 24 is the second stage of a jet pipe servovalve, then a mechanical feedback wire such as illustrated at 26 may be connected between the second stage of the valve and the ejector jet 12. Jet pipe servovalves as thus far described are well known in the prior art. Utilizing such valves, the first-stage flow and pressure response to the application of rated current from the signal source 22 to the torque motor 20 for a high flow gain jet pipe servovalve is as shown at 28 and 30 in FIG. 2. The curve 28 is representative of flow in response to the application of rated current while the dashed line 30 is representative of pressure in response to the application of rated current. It can be seen by reference to the curves 28 and 30 that flow and pressure track each other and rise relatively rapidly upon the application of electrical signals to the torque motor. It is typical in such prior art jet pipe servovalves that full rated pressure across the receptors 14 and 16 is realized upon the application of approximately 25% rated current.

Figure 2:
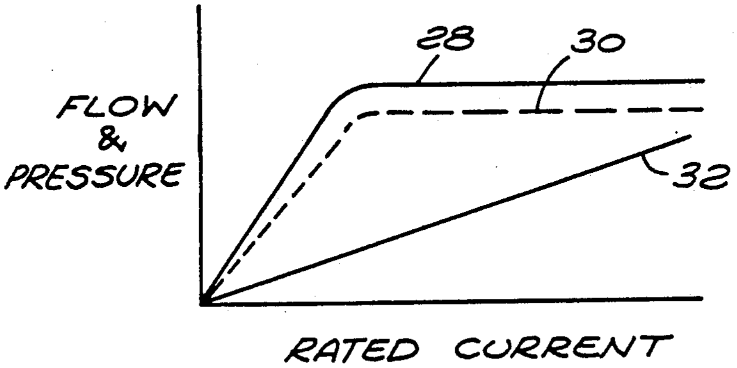
FIG. 2 is a graph illustrating pressure compensation effected by the structure of FIG. 1.
Figure 3:
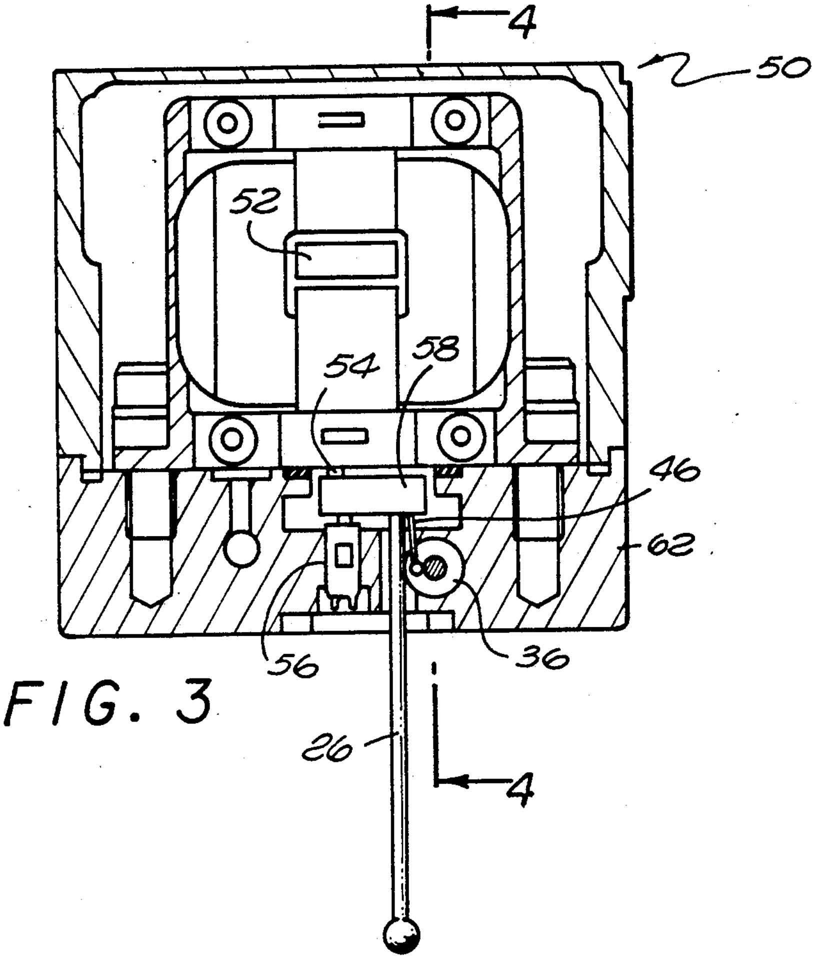
FIG. 3 is a side view partly in cross section of a servovalve constructed in accordance with the principals of the present invention.

In various applications, it is desirable to maintain the flow as illustrated in FIG. 2 but to provide compensation for the pressure gain so that full rated pressure is not realized until substantially full rated current is applied. Such a relationship between pressure and rated current is shown by the solid curve 32. Through utilization of such capabilities, it can be seen that high flow gain as shown by the curve 28 can be realized while at the same time reducing the pressure gain as shown by the curve 32.

To accomplish the desired maintenance of flow gain but with reduced pressure gain, an appropriate pressure feedback apparatus is incorporated into the servovalve and is illustrated in FIG. 1 at 34. The pressure feedback apparatus includes a spool means 36 which is spring centered by utilization of the springs 38 and 40 to maintain the spool centered in the absence of a pressure differential thereacross. The pressure appearing at the receptors 14 and 16 are applied to the ends 42 and 44 of the spool 36. If pressure differences exist between the receptors 14 and 16, the spool 36 will reciprocate responsive thereto. The springs 38 and 40 are sized to provide predetermined movement of the spool 36 proportional to the differential pressure across the spool 36. Mechanical feedback means in the form of a feedback wire 46 is connected between the ejector 12 and the spool 36. As the spool 36 reciprocates responsive to the differential pressures applied thereacross by the receptors 14 and 16, a mechanical force is applied to the ejector 12 which is opposite the force applied thereto by the torque motor 20. As a result, the ejector jet 12 is maintained in a position over the receptors 14 and 16 such that the spool displacement and hence the feedback torque counteracts the torque generated by the torque motor. The net result of this torque balance is a reduced pressure gain as is shown in FIG. 2 at 32.

If the ports C1 and C2 are either interconnected one to the other or are placed under a no load flow condition (that is the load 24 is disconnected), then no pressure differential exists across the receptors 14–16 and likewise no pressure differential exists at the ends 42 and 44 of the spool 36. Therefore, as the ejector jet 12 moves responsive to signals from the source 22, the spool 36 does not reciprocate and the force feedback to the ejector jet 12 is limited to the feedback produced by the small displacement of the ejector jet 12 acting against the feedback wire 46.

By reference now to FIGS. 3 through 6, there is illustrated a jet pipe servovalve constructed in accordance with the principals of the present invention but without a load connected thereto. As is illustrated, the servovalve includes a torque motor 50 having an armature 52 which is in turn connected to a flexure tube 54 to which the feed pipe 55 which feeds fluid to the ejector jet 12 is connected. The receptors 14 and 16 are disposed within an appropriate structure 56. The feedback wires 26 and 46 are affixed to the feed pipe 55 by an appropriate fitting or attaching clamp 58. The spool 36 is reciprocally mounted within a bore 60 disposed within the housing 62. As is more clearly shown in FIG. 4, the springs 38 and 40 are disposed within the bore 60 and maintain the spool 36 centrally disposed in the absence of differential pressure thereacross.

Figure 5:
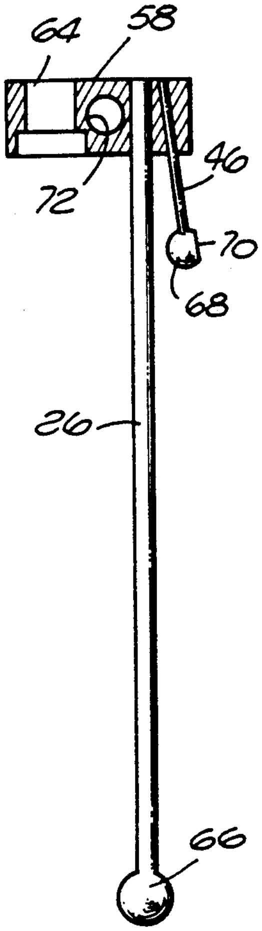
FIG. 5 is a view partly in cross section illustrating the feedback wires utilized in the structure shown in FIGS. 3 and 4.
Figure 4:
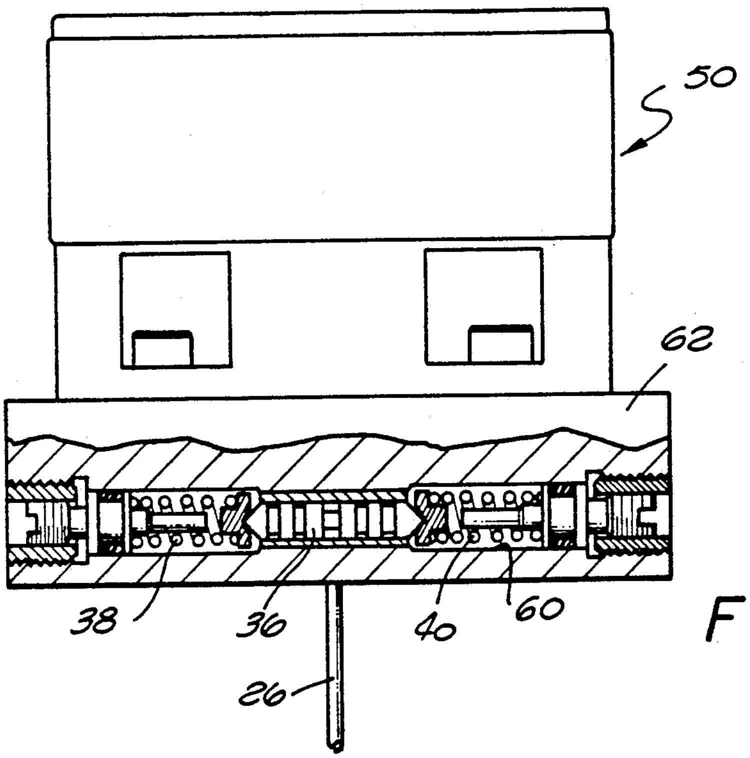
FIG. 4 is a side elevation partly in cross section taken about the lines 4—4 of FIG. 3.

Referring now more particularly to FIG. 5, the arrangement of the mechanical feedback mechanisms in the form of the springs 26 and 46 is illustrated. As is therein shown, a fitting 58 includes an aperture 64 which receives the feed pipe 55. The external feedback spring 26 which is utilized for interconnection with the load 24, if desired, is affixed to the fitting 58 as is the internal feedback spring 46. As is well known to those skilled in the art the external feedback wire 26 provides load spool 24 position feedback to the feed pipe 55. Each of the feedback springs 26 and 46 includes a spherical end section 66 and 68 respectively which is disposed within a slot or opening formed within the respective spool or load as the case may be. As is also noted in accordance with the specific application of the present invention, the spherical end 68 has a flat 70 formed thereon to provide a proper interface with the spool 36 as will become more apparent in conjunction with FIG. 6 hereinafter. The fitting 58 is disposed upon the feed pipe 55 which carries the ejector jet, and is secured in place by an appropriate fastening apparatus which passes through the aperture 72. At the same time, the fastening apparatus also securely clamps the feedback wires 26 and 46 in place. Through this structure application of feedback force to the feed pipe 55 effectively applies the feedback force to the ejector jet 12 causing it to function as above described.

Figure 6:
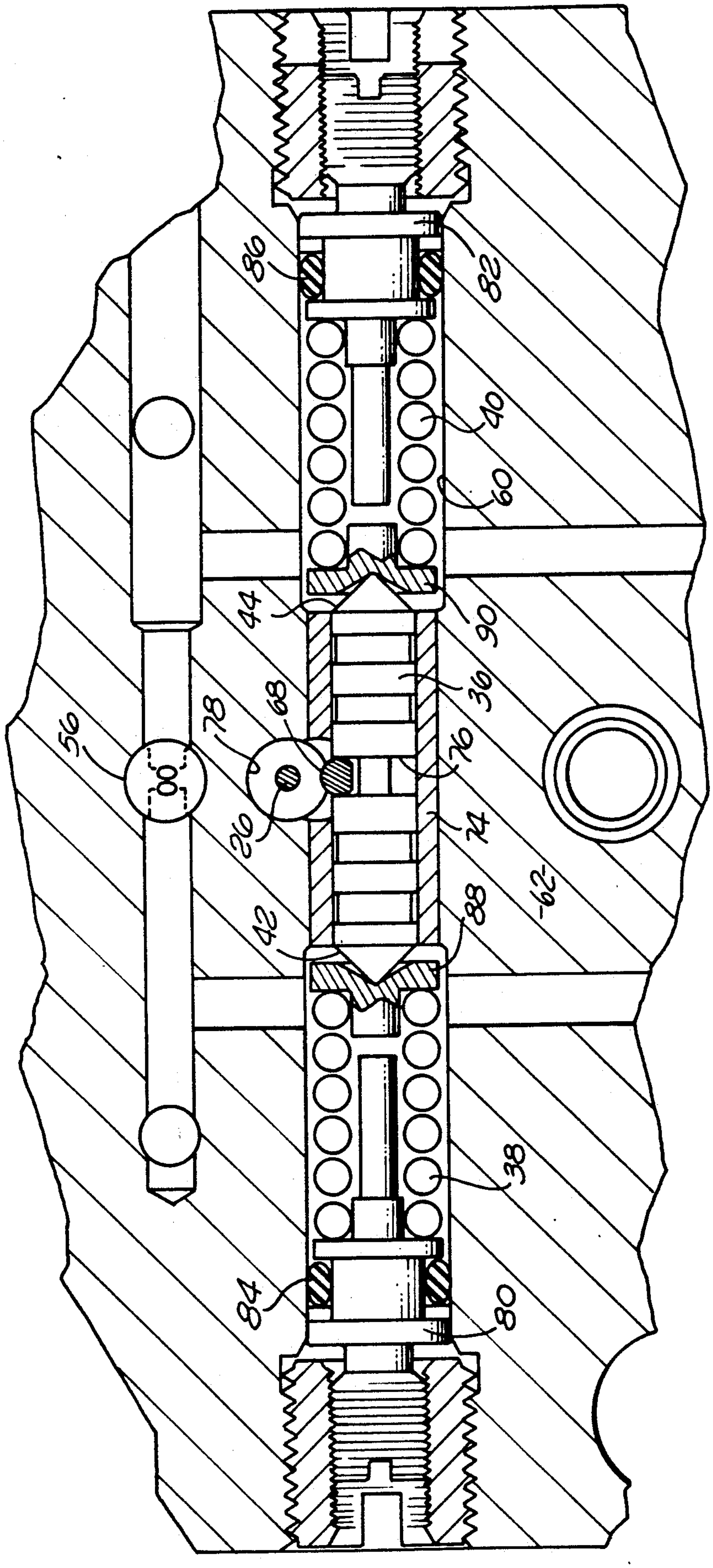
FIG. 6 is a top view partially in cross section illustrating the interconnection of the feedback wire with the spool valve.

As is seen more specifically in FIG. 6, the spool 36 is reciprocally disposed within a sleeve 74 which in turn is disposed within the bore 60 provided within the housing 62. A central groove 76 is provided in the spool 36 to receive the spherical ball 68 disposed at the end of the feedback spring 46. The external feedback wire 26 extends through an opening 78 provided in the housing 62. The opening 78 is connected to system return and thus allows any leakage past the spool 36 which may occur to return to the source of fluid 18 as is well known in the prior art. As is also well known the ejector/receptor region of the valve is ported to system return as by connection to the opening 78.

The bore 60 is appropriately sealed at each end thereof by threaded plugs 80 and 82 along with O-rings 84 and 86. Springs 38 and 40 are secured in place between the ends of the plugs 80 and 82 respectively and retainers 88 and 90 which contact the ends 42 and 44 of the spool to thereby retain the spool in a central neutral position in the absence of the application of differential pressure to the ends 42 and 44 of the spool 36.

During the time that the ports C1 and C2 are blocked, that is, a load device is connected thereto, the torque motor output torque must balance the flexure tube torque, the torque applied to the ejector from the pressure feedback wire 46 and if present, torque from the external feedback wire 26. This torque balance is represented by the following equation.

$$K_t*i=(k_0-k_m)*a+k_1*l_1*a*(l_1-l_2)+k_2*l_3*(a*(l_1-l_2)+x)$$

where;
$K_t$=Torque Motor Gain (in-lb/amp)
i=Input Current (amp)
$k_0$=Spring Rate, Flexure Tube (in-lb/rad)
$k_m$=Spring Rate, Torque Motor Magnetic (in-lb/rad)
a=Armature Rotation (rad)
$k_1$=Spring Rate, External Feedback Wire (lbf/in)
$k_2$=Spring Rate, Feedback Wire, Pressure Feedback (lbf/in)
$l_1$=Length, Armature Pivot to External Feedback Wire Ball Center (inch)
$l_2$=Length, External Feedback Wire Mount to Ball Center (inch)
$l_3$=Length, Armature Pivot to Pressure Feedback Feedback Wire Ball Center (inch)
x=Spool Stroke (inch) Feedback spool
Note: $k_1*l_1*a*(l_1-l_2)=0$, if external feedback wire is not used.

Figure 7:
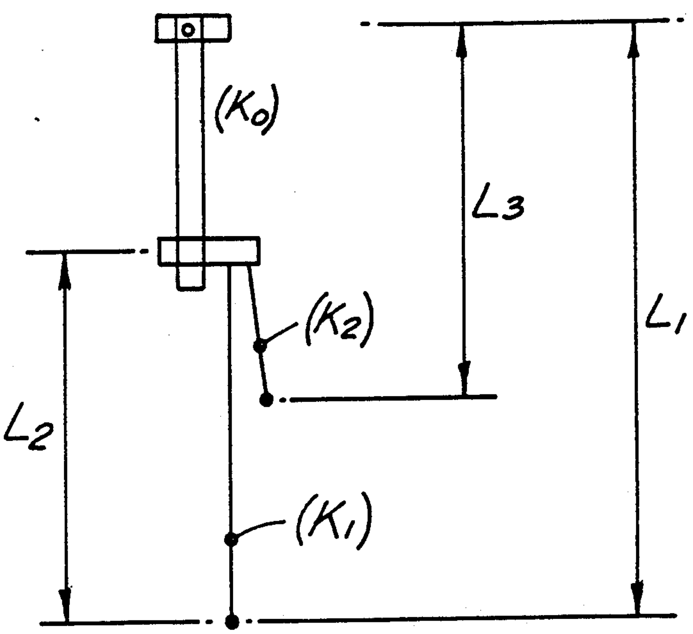
FIGS. 7 and 8 are schematic illustrations showing the operation of the feedback wires and the various forces encountered in providing the pressure compensation in accordance with the principals of the present invention.
Figure 8:
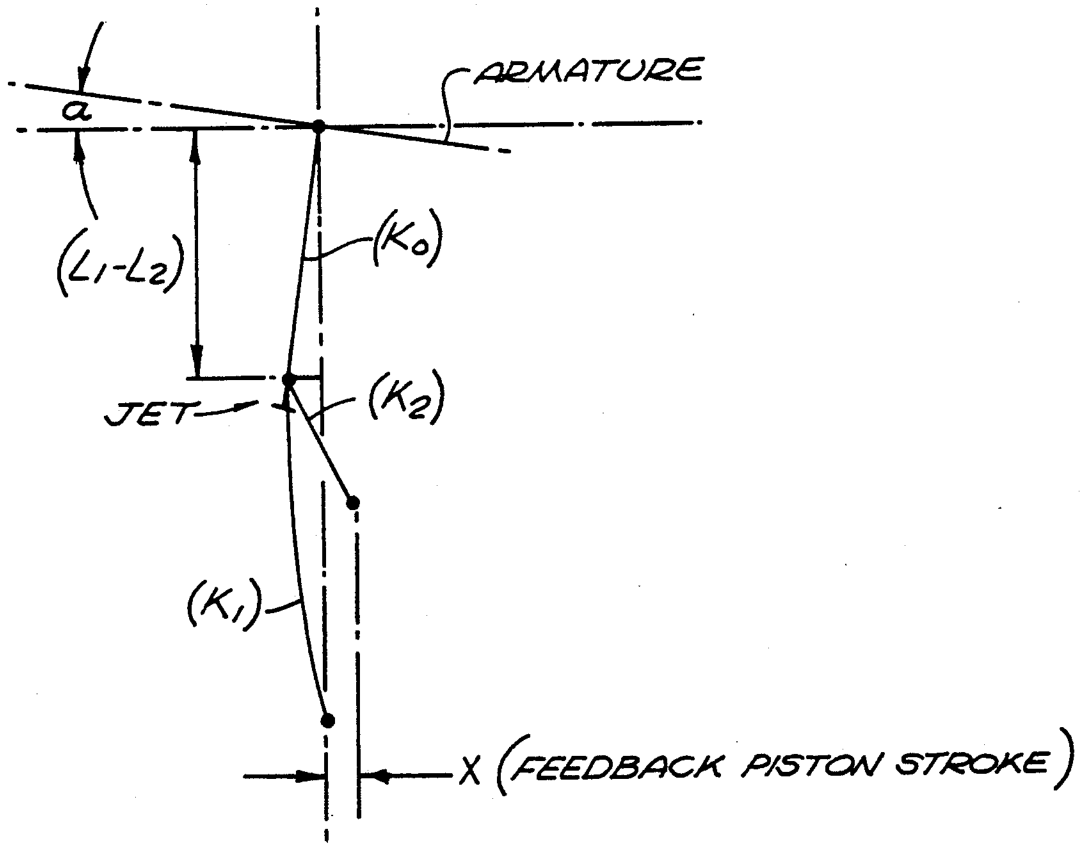

The various elements of the equation set forth above are taken from the structure as illustrated in FIGS. 7 and 8 to which reference is hereby made. FIG. 7 is depicted with the armature 52 rotating 90 degrees to the plane of the paper upon which the drawing is made while FIG. 8 is rotated 90 degrees thereto. For status equilibrium of the pressure feedback spool, the following force equation must be satisfied:

$$A_p*(P_1-P_2)=2*k_s*x+k_2*(x+x_j)$$

where;
$A_p$=Spool Area (inch squared)
$P_1$=Recovery Pressure Cyl 1 (psig)
$P_2$=Recovery Pressure Cyl 2 (psig)
$k_s$=Spring Rate, Compression Spring (lbf/in)
$x_j$=Jet Displacement, corresponding to $P_1$ and $P_2$ (inch)

In addition, when an external feedback wire is used, the following torque balance must also be satisfied:

$$K_t*i=X*k_1*l_1$$

where;
X=Stroke, External Feedback Wire (inch)

The flow gain torque balance for the structure as illustrated in FIGS. 7 and 8 is represented by the following equation.

FLOW GAIN TORQUE BALANCE:

$$K_t*i=(k_0-k_m)*a+k_1*l_1*a*(l_1-l_2)-k_2*l_3*a*(l_1-l_2)$$

This equation is valid so long as the armature is rotating and has not contacted the stops provided therefor. The various elements of the equation immediately set forth are the same as those defined with respect to the pressure gain torque balance equation.

There has thus been disclosed a jet pipe servovalve which provides compensated pressure gain without degrading flow gain.

What is claimed is:

1. A jet pipe servovalve having first stage pressure gain compensation comprising:

a source of fluid under pressure;

an ejector jet means connected to said source of fluid;

first and second receptors disposed to receive fluid from said ejector jet;

a torque motor connected to said ejector jet for generating force moving said ejector jet relative to said receptors responsive to electrical signals applied to said torque motor;

first and second output ports connected to said first and second receptors for applying said fluid from said receptors directly to a load;

spool means having first and second ends mounted for reciprocal movement;

means connecting said fluid at said first and second receptors to said first and second ends of said spool means respectively for moving said spool means responsive to pressure differential between said first and second receptors, there being no other pressure fluid connection to said spool means; and mechanical feedback means connected between said spool and said ejector jet for applying force feedback to said ejector jet proportional to said pressure differential and opposite the force applied by said torque motor to thereby compensate pressure gain of said servovalve.

2. A jet pipe servovalve as defined in claim 1 wherein said spool means includes spring means disposed at each end of said spool means for maintaining said spool means centered in the absence of a pressure differential applied thereto.

3. A jet pipe servovalve as defined in claim 2 wherein said mechanical feedback means is a feedback wire connected between said ejector jet and said spool means.

4. A jet pipe servovalve as defined in claim 3 which further includes second mechanical feedback means affixed to said ejector jet means for connection to said load means.

* * * * *